June 27, 1961  F. J. FINK  2,990,043
CLUTCH ADAPTED FOR SINGLE POINT ACTUATION
Filed May 16, 1957  2 Sheets-Sheet 1
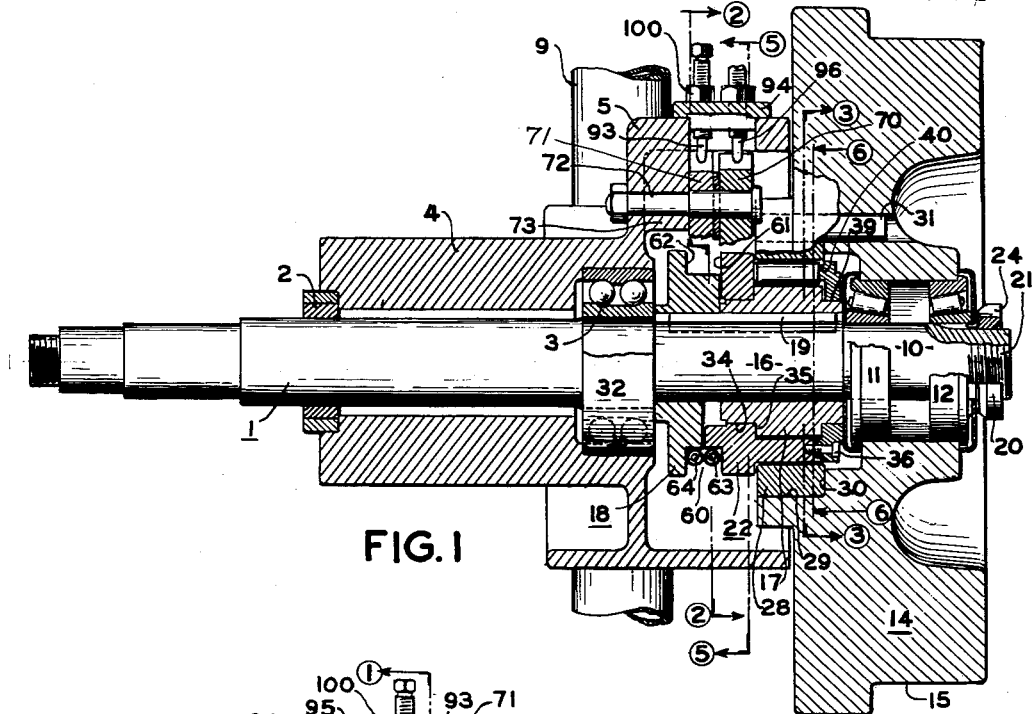
FIG. 1
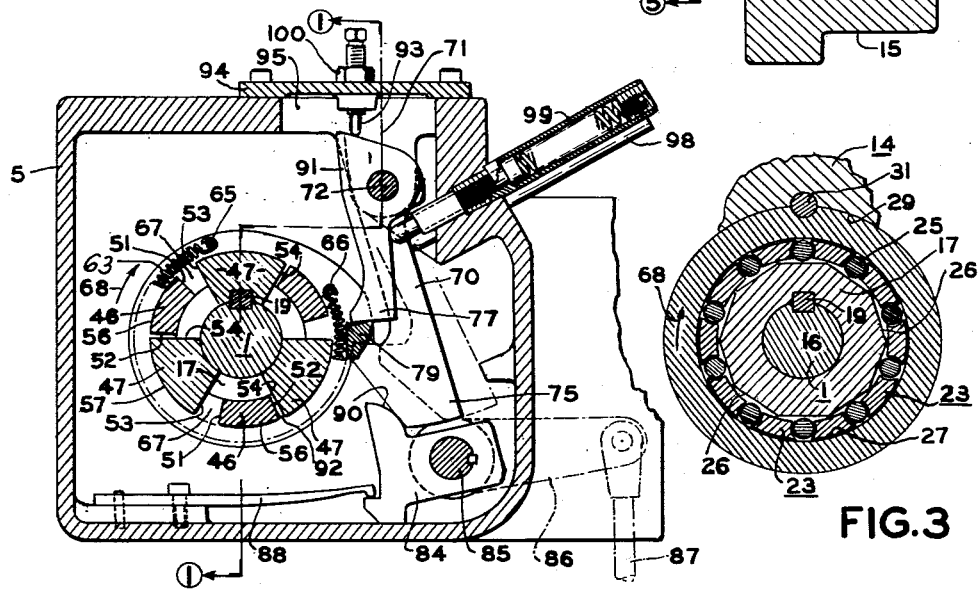
FIG. 2
FIG. 3
INVENTOR:
Frank J. Fink
BY Bosworth, Sessions,
Herrstrom and Knowles
Attorneys June 27, 1961 F. J. FINK 2,990,043
CLUTCH ADAPTED FOR SINGLE POINT ACTUATION
Filed May 16, 1957 2 Sheets-Sheet 2

INVENTOR:
Frank J. Fink
BY Bosworth, Sessions,
Herrstrom and Knowles
Attorneys

United States Patent Office 2,990,043
Patented June 27, 1961

2,990,043
CLUTCH ADAPTED FOR SINGLE POINT ACTUATION
Frank J. Fink, Chardon, Ohio, assignor to The Motch & Merryweather Machinery Company, Euclid, Ohio, a corporation of Ohio
Filed May 16, 1957, Ser. No. 659,589
9 Claims. (Cl. 192—27)

This invention relates to clutches of the cam type, more particularly to such clutches characterized by one-point operation, in that the driven member is arranged to be stopped at a single predetermined point.

Machines designed to perform cyclic operations such as advancing, lifting, turning, dipping, spraying, wrapping or cutting a product often incorporate rotating components that must stop at predetermined points in their orbits. To achieve this objective, so-called one-point clutches have been conventionally used. Such clutches customarily employ positive contact parts such as jaws, latches and dogs to obtain the desired accuracy in the stoppage of the rotating component. This use of direct contact positive stoppage components results in high impact and shock loads that produce fatigue and develop stresses which in conventional clutches result in early failure of a critical part unless the device is made of much heavier construction than the normal running load requires.

The invention is used to advantage in a clutch of the cam type in which a number of drivers or rollers angularly spaced about the rotational axis of the clutch are interposed between confronting reaction surfaces of driving and driven components. The confronting surfaces define an annular space which accommodates the drivers and the configuration of which changes upon slight relative rotation of one member relative to the other to alter the radial extent of the clearance space that contains the drivers so that the latter are brought into or released from driving relation to the clutch members. In such a clutch the drivers are held in angularly spaced relation to one another by a carrier which rides on or is supported by one of the clutch members.

The invention is especially applicable to the drive, say, of a stock cut-off machine wherein automatic stoppage occurs at a predetermined point after completion of a single revolution of the driven member following release of the control element or driver roll carrier to effect a connection between the driving and driven members. The clutch is thus a single-revolution single-point device. This single revolution operating characteristic is achieved conventionally by a double latch or dog arrangement, an arresting latch or dog engaging the driver roll carrier to effect its immediate stoppage and a holding latch or dog engaging the driven clutch member to prevent retrogression after a predetermined lost motion travel thereof subsequent to the stoppage of the carrier. The lost motion travel of the clutch member is accomplished by inertia and is cushioned by a spring or other energy storing and biasing means acting between it and the carrier which then tends normally to take up the lost motion and return the carrier and the complemental driven clutch member to the relative positions in which the drive rollers are cammed into engaged positions and the drive is established between the clutch members.

The present invention as one of its principal objectives aims to provide a clutch device having direct contact elements for arresting the rotary motion of the driven clutch component that distribute shock loads in the avoidance of stress and fatigue concentrations. In this manner long life, reliability and durability are obtained in the clutch. Furthermore the distribution of shock loads permits the use of parts of relatively smaller section with attendant economy in the saving of material and reduction in weight and space requirements of the device, these being further objectives.

In its preferred form such a clutch incorporates a rotatable combined control element and carrier for the driver rollers which is of unique design. It is arranged to be stopped by the arresting latch, dog or detent at any desired point of its rotation and, in turn, to effect stoppage of the driven component of the clutch with the shock load distributed. The control element and the driven clutch component are formed complementally with a plurality of interfitting tooth or lug means disposed to bear against one another simultaneously at a series of points angularly spaced about the rotary axis of the clutch, the provision of this specialized structural feature being another of the objects of the invention.

In accordance with the present invention and as a refinement of its principal objective the carrier for the drivers and the driven clutch member are relatively rotatable and complementally formed with the interfitting lugs mentioned so as to incorporate the desired lost motion interfitting positive drive connection wherein, upon arresting the rotative movement of the carrier, the carrier and the clutch member lock together by engaging one another simultaneously at a plurality of points angularly spaced about the rotational axis of the clutch to stop the driven clutch member at the desired point in its orbit following lost motion rotative movement sufficient to effect clutch disengagement.

As a still further objective of the invention the carrier for the rollers or drivers in a clutch of the character referred to is provided with an annular outrigger or ring secured to the outer ends of the guides or spacing elements which separate the drivers and locate them in angularly spaced relation about the clutch axis. Such an arrangement reinforces the spacing elements against individual deflection under starting and other heavy loads so as to maintain the drivers in correct relationship to the reaction surfaces of the driving and driven members of the clutch, this being a further objective of the invention.

As a refinement of the carrier outrigger feature of the invention the carrier comprises, in effect, a pair of axially spaced rings. At least one but preferably both of the carrier rings embrace and are rotatable on one, preferably the inner, of the clutch members. The spaced rings are joined or connected together at a plurality of circumferentially spaced points by the spacers or guides that extend through the annular space between the driving and driven members of the clutch and separate the drivers from one another. In a specialized version of the invention the carrier and the clutch member on which it is mounted are formed with axially spaced radial shoulders that locate the parts and provide an interlock while permitting relative rotative movement.

Other objects and advantages relate to novel features of construction and combinations of parts set forth in the following detailed description of a clutch which represents the best known mode of practicing the invention. This description is made in connection with the accompanying drawings forming a part of the specification.

In the drawings:

FIGURE 1 is a sectional view with parts broken away or removed to show details taken generally in an axial plane and planes parallel to such axial plane through a one-point single revolution clutch structure for intermittently actuating a shaft from a constantly rotating flywheel, this view showing the clutch engaged and being taken generally along the irregular line indicated at 1—1 of Fig. 2;

FIG. 2 is a transverse sectional view, also with parts removed and parts broken away, through the clutch structure of FIG. 1 showing the relationship of parts when the clutch is disengaged, this view being taken substantially in the plane represented by the line 2—2 of FIG. 1;

FIG. 3 is a fragmentary transverse sectional detail showing the driving and driven members of the clutch, the rollers or drivers and the guides of the carriers which space the drivers, this view being taken substantially in the plane indicated by the line 3—3 of FIG. 1 and showing the relationships of the parts when the clutch is disengaged;

Figure 5:
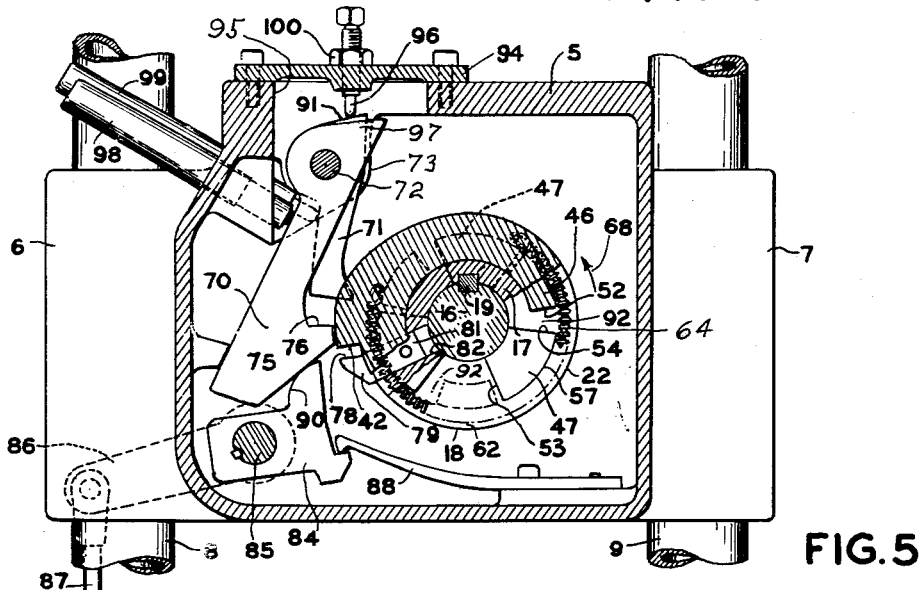
Figure 6:
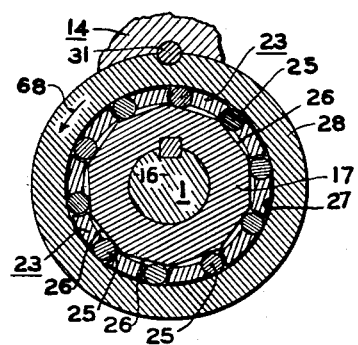

FIG. 5 is a transverse sectional detail with parts removed and broken away, this view being taken substantially in the plane represented by the line 5—5 of FIG. 1 but differing from FIGS. 1 through 3 in that the clutch is shown engaged; and FIG. 6 is a fragmentary sectional detail similar to FIG. 3 showing the relationship between the driving and driven clutch members and the interposed rollers or drivers when the clutch is engaged, this view being taken as though on the line 6—6 of FIG. 1.

The illustrated one point, one revolution clutch embodying the invention comprises a number of rotatable members carried by a driven shaft 1 mounted as by axially spaced bearings 2, 3 in a tubular support 4 comprising an integral extension of the wall of a housing 5 that encloses all but one of the rotatable members and the operating mechanism of the device. This housing is conveniently formed as an iron casting and has a pair of spaced tubular bosses 6, 7 formed with bores that receive parallel rods 8, 9 on which the device is supported. The support rods 8, 9 are fast at their ends to the frame of the machine with which the clutch is associated.

The output end of the shaft projects from the tubular extension 4, to the left in FIG. 1, and receives a suitable pulley, gear or coupling (not shown) for connecting the shaft to the mechanism to be operated. Mounted on the other or right hand reduced diameter end 10 of the shaft 1 for free relative rotation as by roller bearing assemblies 11, 12 is main driving member 14 which may comprise a flywheel that stores energy for intermittent release to the shaft 1. The rotary driving member 14 is suitably actuated at desired speed as by an endless belt trained around its cylindrical periphery 15, the belt in turn being driven as by an electric motor or other prime mover.

Between the main ball bearing assembly 3, which supports the shaft 1 in the support 4, and the roller bearing assembly 11, which supports the flywheel 14 on the reduced end of the shaft, an intermediate diameter portion 16 of the shaft receives primary and secondary driven members or hubs 17, 18. These hubs abut one another and are confined against relative movement axially of the shaft between the inner races of the bearing assemblies. A key 19 common to the two hubs prevents rotation of the hubs relative to the shaft. The ball bearing assembly 3 is a thrust bearing restraining the shaft 1 against axial movement relative to the support 4 and the tapered bearing assemblies 11, 12 restrain the flywheel 14 against axial movement relative to the shaft 1. Suitable dust caps are provided for the bearings 11, 12 and ring 20 screwed onto the reduced diameter threaded end portion 21 of the shaft and held by key 24 crowds the bearing assemblies 11, 12 together. The bearing 11 holds the primary hub 17, the primary hub engages one end of and holds the secondary hub 18 and the latter, at its other or left hand end as seen in FIG. 1 seats against shoulder 32 at the juncture of the intermediate portion 18 and the main portion of the shaft 1. Thus held against axial displacement, the several components are retained in place on the shaft.

A number of cylindrical driving rollers 25 are received in an annular space provided between outwardly directed flat surfaces 26 which comprise the polygonal or non-circular periphery of the primary hub 17 and a surrounding inwardly directed cylindrical surface 27 of a hard steel reaction ring 28 fast to the flywheel or driving member 14. Desirably the ring 28 is recessed in a counterbore 29 of the flywheel and located against a radial shoulder 30 which delineates the axial depth of the counterbore. A pin 31 press fitted in a hole drilled parallel to the rotational axis of the shaft 1 at the interface between the flywheel 14 and reaction ring 28 locks the reaction ring against rotation relative to the flywheel driving member 14.

A carrier 22 is mounted on the primary driven hub 17 for relative rotative movement. The carrier has a number of generally parallel axially extending fingers or guide elements 23 arranged in a circle concentric to the rotational axis of the clutch. These guide elements reach into the annular space between the hub 17 and the driving flywheel and separate the driving rollers 25 from one another, the guide element fingers having confronting cylindrically curved surfaces 43 along their sides which engage and confine the rollers. The carrier 22, desirably a steel casting, has an inwardly directed cylindrical machined surface 33 which is received about a cylindrical end portion 34 of the primary driven hub 17 in a snug but free running fit which permits relative rotative movement between the parts while maintaining the cylindrically curved guide elements 23 concentric to the rotational axis of the shaft 1. Radial shoulders on the hub 17 and carrier 22 abuts one another and locate the parts in predetermined axial relationship, the hub shoulder being indicated at 35.

The outer ends of the carrier guide finger elements 23 are individually secured as by cap screws 36 to a ring 38 received over and having a running fit on a cylindrical guide surface 39 and against a radial locating shoulder 40 of the inner hub member 17. The annular shoulders 35, 40 of the hub 17 are parallel and oppositely directed, being located at the opposite ends of the flat outwardly directed surfaces 26 that constitute the polygonal periphery of the hub. Thus the carrier 22 and the ring 38 are held captive on the hub as a unit, the unit being restrained against axial movement relative to the hub while being rotatable thereon. The ring 38 constitutes an outrigger connecting together the outer ends of the guide elements 23 and reinforcing them against deflection so as more effectively to resist forces imposed by the drive rollers 25 when the latter are engaged between the hub 17 and the reaction ring 28 in establishing a driving connection between the parts.

The periphery of the carrier 22 extends radially beyond the cylindrical surface 27 of the reaction ring 28 and is formed with a radial stop shoulder 42 disposed in an axial plane. The entire periphery of the carrier, save for the shoulder 42, is a smoothly curved annular surface.

The drive rollers 25 individually are closely confined between the axial guide finger elements 23 of the carrier, the confronting arcuately curved surfaces 43 of adjacent guide elements spacing the rollers in predetermined uniform arcuately spaced relation to one another about the polygonal periphery of the hub 17. Their axes are thus held parallel to one another, uniformly spaced from and parallel to the rotational axis of the main shaft 1. Rotative movement of the carrier 22 relative to the inner hub 17 is thus effective to shift the drive rollers 25 simultaneously and circumferentially about the non-circular polygonal periphery of the inner hub member 17 so as to make and interrupt a driving connection between the clutch parts.

Such relative rotative movement of the carrier 22 is limited by an interfingered fit between the carrier and the secondary hub 18 which provides a lost motion connection between these parts. As shown to advantage in FIG. 4, outside end face 45 of the carrier 22 is formed with a plurality of circumferentially spaced axially directed segmental lugs 46 that are adapted to be received between similar lugs 47 integrally formed on confronting end face 48 of the secondary hub 18. The mating arrangement thus provided between the secondary hub 18 and the carrier 22 establishes, in effect, a positive multiple direct contact drive between these parts. Since the secondary hub 18 is fast to the shaft 1 by the key 19 the carrier 22 is likewise locked to the shaft through the lost motion connection provided by the interfitting lugs 46, 47, as shown in FIGS. 2 and 5. The lugs 46, 47 have sufficient clearances to permit enough relative rotative movement of the carrier 22 about the shaft and the hubs to move the drive rollers 25 between engaged positions wedged between the outwardly directed polygonal periphery of the primary hub 17 and the inwardly directed cylindrical surface 27 of the reaction ring 28 (FIG. 6) and released positions, shown in FIG. 3, in which the rollers 25 are located adjacent those portions of the hub flats 26 which do not hold them against the reaction ring 28.

The lugs 46 of the carrier are of such circumferential length relative to the lugs 47 of the secondary hub 18 that at the limits of movement of the carrier relative to the hub the carrier lugs simultaneously engage the secondary hub lugs at a number of points spaced circumferentially about the rotational axis of the device.

The carrier lugs 46 are delineated in circumferential extent by oppositely directed abutment faces 51, 52 which are located in angularly disposed axial planes of the device; similarly abutment faces 53, 54 delineate the lugs 47 and are located in angularly disposed axial planes. In engaged positions at the limits of relative movement between the parts either the lug faces 51 are all in flatwise contact against the lug faces 53 or the lug faces 52 are all engaged against the lug faces 54.

Figure 4:
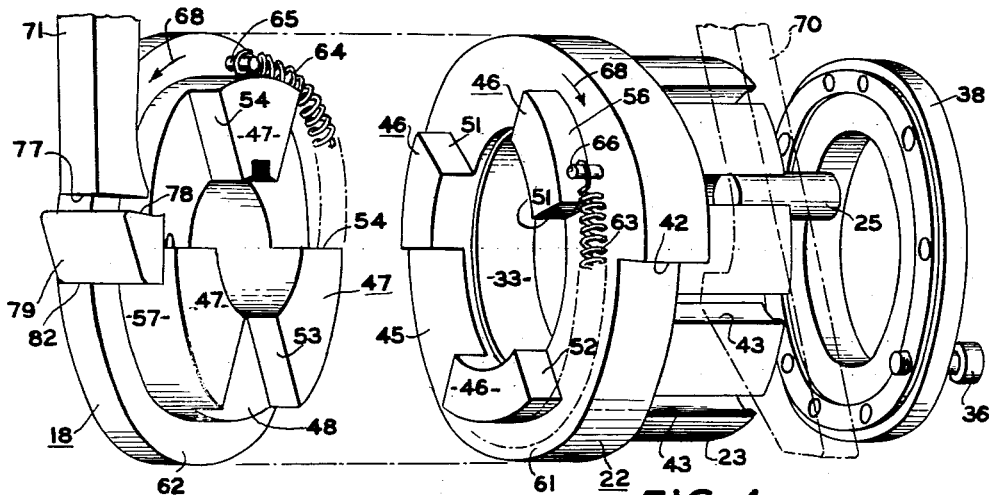
Fig. 4 is an exploded view, partly diagrammatic and with parts removed, showing the construction of the combined control element-carrier and its relation to the complemental driven clutch member with which it is associated and to the arresting latch and the holding dog.

The carrier lugs 46 and the hub lugs 47 have radially outwardly directed cylindrically curved faces 56, 57 respectively, all concentric to the rotational axis of the clutch and all of the same radius. These outer faces of the lugs define the bottom of an annular channel 60 having spaced confronting side walls 61, 62 provided by those portions of the carrier 22 and the secondary hub 18 that extend radially outwardly beyond the lugs 46, 47, respectively. This channel receives a pair of helical coil tension springs 63, 64 which are thus supported on the outer edges of the lugs and bias the carrier 22 rotatively toward the drive position of FIGS. 5, 6 in which the rollers 25 are engaged or wedged between the flats 26 of the primary hub 17 and the cylindrical reaction surface 27 of the ring 28. The springs 63, 64 are disposed in side by side relation and function together, each being secured at one end to an axial anchoring pin 65 received as by a press fit in the wall 62 of the hub 18, and at the other end to an axial pin 66 similarly secured in the wall 61 of the carrier 22. In FIG. 4 the end portion of the spring 63 normally connected to the pin 65 fast in the secondary hub 18 and of the spring 64 normally connected to the pin 66 fast in the carrier 22 are removed so as better to show the confronting faces of such hub and carrier.

In the release position of the clutch parts shown in FIGS. 1–3 the springs 63, 64 are stressed and maintain forces on the pins 65, 66 tending to rotate the carrier 22 forwardly in clockwise direction as viewed in FIGS. 2 and 3 relative to the primary hub 17 to close gaps 67 between the faces 51, 53 of the lugs 46, 47, respectively. Thus the biasing force of the springs tends to move the carrier 22 in the direction of rotation of the flywheel 14 and the shaft 1 when the clutch is engaged, such normal rotational direction of the structure being indicated by arrows 68.

The carrier 22 and the hub 18 are held in the release position of FIGS. 1–3 against the forces of the springs 63, 64 by a hook or latch 70 and a detent or dog 71 pivotally mounted inside the housing 5 on a pin 72 fast in a boss 73. The pin 72 is parallel to the rotational axis of the clutch so that the latch and dog which are suspended from the pin swing in planes normal to the clutch axis.

The hook 70 has a head end 75 providing a surface 76 disposed for engagement by the radial stop shoulder 42 of the carrier 22 so as to arrest the rotary movement of the carrier 22 at a single predetermined point in its rotation (clockwise in FIG. 2, counterclockwise in FIG. 5).

The dog 71 has a lower or foot end 77 engageable by face 78 of a retention lugs 79 on and projecting radially from the periphery of the hub member 18. The lug 79 is conveniently made L-shaped separate from the hub 18. It has a lateral attaching arm 81, FIG. 5, received in a radial slot 82 of the hub member 18, the arm of the lug being secured to the hub as by a screw or bolt.

In the release position of the device and as shown in FIG. 2 the engagement of the carrier stop shoulder 42 and the hub lug 79 by the hook 70 and the dog 71, respectively, holds the carrier 22 in such rotative position relative to the hub 17 that the drive rollers 25 are ineffective to couple the clutch parts together and the flywheel 14 rotates freely about the shaft 1 and the polygonally shaped hub 17. When the clutch is to be engaged to cycle the mechanism the hook 70 is withdrawn (to the broken line position of FIG. 2, the full line position of FIG. 4) thereby withdrawing the hook face 76 from the stop shoulder 42 of the carrier. Such withdrawal of the hook is accomplished manually or as by a lever 84 keyed on a stub shaft 85 rotatably mounted in a boss of the housing 5. A lever 86 fast on the outside end of the stub shaft 85 rocks the shaft when the lever is actuated downwardly as by a rod 87 pinned at 89 to the outer end of the lever. Such rocking of the shaft 85, against the restoring force of a cantilever mounted leaf spring 88 fast in the housing and having its free end engaged against a shoulder on an extension of the lever 84, moves curved cam portion 90 of the lever 84 against the head 75 of the hook to effect the desired shifting of the hook which withdraws the hook from the stop shoulder 42 of the carrier, releasing the latter. The released carrier advances or rotates forwardly under the influence of the biasing springs 63, 64 from the clutch release position of FIGS. 2, 3 to the engaged position of FIGS. 5, 6. This forward shifting of the carrier 22 partially closes the gaps 67 between the confronting surfaces 51, 53 of the lugs 46, 47 and opens gaps 92 between confronting surfaces 52, 54 of the carrier and hub lugs. The lugs 46, 47 are proportioned to provide sufficient lost motion of the carrier 22 relative to the hub 17 to move the guides 23 and the drive rollers 25 from the release position of FIG. 3 to the drive position of FIG. 6, in which the rollers 25 are wedged between the cylindrical reaction surface 27 of the ring 28 and the flats 26 of the hub 17, without engagement between the interfingered lugs. Preferably the lost rotary motion provided between the carrier 22 and the hub 18 represented by the clearances 67, 92 is somewhat greater than that necessary to shift the drive rollers between the release position of FIG. 3 and the drive position of FIG. 6 so that, as shown in FIG. 5, the confronting faces 51, 53 of the lugs are separated in the drive position by clearances which insure full and positive engagement of the drive rollers 25 between the inner and outer components of the clutch against which they react in establishing the driving connection. In the arrangement illustrated by way of example the three equiangularly spaced lugs 46 on the carrier 22 are each about 45° in extent and the interfitted lugs 47 of the secondary hub 18, also equiangularly spaced, are each about 60° in circumferential extent.

During the driving connection the reaction of the drive rollers 25 against the peripheral flats 26 rotates the hub 17, the rotation being clockwise as viewed in FIG. 2, counterclockwise as viewed in FIG. 5. This rotation of the hub and the shaft 1 to which the hub is keyed moves the retaining lug 79 away from the lower end 77 of the dog 71, the latter remaining in position against an adjustable stop 93. This stop engages an extension finger 91 on the upper end of the dog 71, the stop being carried by a removable cover plate 94 secured to the housing 5 over an access opening 95 in the latter. This opening is directly above the fixed pin 72 which carries the hook 70 and the dog 71. Another adjustable stop pin 96 engages an extension finger 97 on the upper end of the hook 70 to limit the swinging movement of the hook toward the carrier 22. The stop pins 93, 96 are threaded through tapped holes in the cover plate 94 and held in adjusted positions by lock nuts 100.

The hook 70 and the dog 71 are biased toward the carrier 22 and the hub 18, respectively, by spring pin assemblies 98, 99, respectively, screwed into tapped holes through integral bosses on one of the side walls of the housing 5. The working ends of the spring pins are located to bear against the hook and the dog at points spaced below the pivot pin 72. Thus, after the hook 70 has been withdrawn from the stop shoulder 42 of the carrier 22 by actuation of the lever 84 to release the latter for rotation of the driven parts of the assembly and the lever is returned to its normal position by the leaf spring 88, the hook 70 immediately is returned to the full line position of FIG. 2 by the spring pin 98, the face 76 of the hook being thus positioned in the path of the stop shoulder 42 of the carrier so as to arrest the latter when the shaft has completed a single revolution. This arresting of the carrier stops the drive rollers 25 which are held between the spacing fingers 23 of the carrier and continued rotary movement of the hub 17 by reason of the inertia of such hub and the shaft and any other parts and components secured thereto interrupts the driving connection between the flywheel 14 and the hub 17, since the drive rollers 25 shift to the release position shown in FIG. 3 opposite the low central portions of the hub flats 26.

Continued over travel of the hubs 17, 18 and the shaft 1 after the carrier 22 is arrested by the hook 70 closes the gaps 92 between the faces 52, 54 of the lugs 46, 47, respectively, and the coming together of such lug faces positively stops the rotation of the hubs and the shaft at a predetermined point in the cycle of the mechanism. Since these impact faces 52, 54 of the carrier and driven member lugs are angularly spaced about the clutch axis, the shock loads imposed on the parts in stopping the shaft are circumferentially distributed about the device so as to eliminate concentration of stresses. Such arrangement permits construction of both the carrier 22 and the hub 18 of relatively small section, thereby achieving a compact light-weight design.

The impact between the lug faces 52, 54 which arrests the rotative movement of the shaft occurs after the lug 79 on the hub 18 has advanced slightly beyond the foot 77 of the dog 71. In thus passing the dog the inclined leading face of the lug 79 engages the dog and displaces it against the force of the spring pin 98. As soon as the lug 79 clears the foot 77 of the dog the latter is swung toward the driven hub member 18 by the spring pin and advances over the abutment face 78 of the dog to the latching position shown in FIG. 2, which prevents retrogression of the hub and shaft and retains the clutch in released position.

In order to provide adequate clearance for the foot 77 of the dog 71 the circumferential extent of the lugs 46 relative to the circumferential extent of the lugs 47 is proportioned so that the positive stoppage of the shaft 1 does not occur until the lug 79 has moved slightly beyond and fully clear of the foot 77 of the dog 71. Thus, after movement of the retaining dog 71 to the full line position of FIG. 2, slight retrogression or reverse rotative movement of the hub 18 and its lugs 47 takes place, moving such lugs away from the lugs 46 of the carrier 22 with the result that slight clearances occur between the confronting stop faces 52, 54.

The present invention thus provides in a one point single revolution clutch structure for use in intermittently actuating a mechanism to be operated cyclically, a compact, light-weight carrier for controlling the drivers that make and break the driving connection. The output shaft can be intermittently operated to turn through a single revolution or any desired number of angular degrees and can be connected to relatively heavy inertia loads, since the shock of stopping is divided between a multiplicity of interfingered lugs providing distribution of such shock loads to a number of points spaced angularly about the rotational axis of the clutch. The balance of the rotating components is improved over prior designs and the entire structure is confined to a relatively small compact package.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. A clutch comprising driving and driven members mounted for rotation about a common axis, an annular carrier element mounted on one of the members for relative rotation about said axis, an annular hub element surrounding said axis and mounted for rotation with said one clutch member, said annular carrier and hub elements being formed complementally each with a plurality of lugs spaced angularly about said axis, the lugs of one element being interposed between the lugs of the other element and angularly spaced therefrom with intervening circumferential clearances in the provision of a mechanical lost motion interlock between the elements wherein the lugs of one element bear against the lugs of the other element at a first series of points angularly spaced about the rotational axis of the clutch in establishing a forward driving connection and limit of relative rotative movement in one direction between the elements and wherein the lugs of one element bear against the lugs of the other element at a second series of similarly spaced points in establishing a reverse driving connection and limit of relative rotative movement in the other direction between the elements, the lugs of one element having outer arcuate surfaces concentric to the axis, said annular carrier and hub elements being formed with confronting axially spaced circumferentially extending surfaces located radially outwardly of said arcuate lug surfaces, spring means located radially outwardly of and supported on said arcuate lug surfaces, the spring means being located between the axial limits of the lugs of one of the elements, said spring means being confined between said confronting surfaces and connected to and reacting on the carrier and lug elements to bias them in said one direction of relative rotative movement, and driver means interposed between the driving and driven members and actuated by said relatively rotatable carrier element, said driver means and the driving and driven members being adapted to establish a torque connection between the members upon relative movement of the carrier and hub elements toward said forward limit and to release the torque connection between the members upon relative movement of the elements toward the reverse limit.

2. A clutch comprising driving and driven members mounted for rotation about a common axis, an annular carrier element mounted on one of the members for relative rotation about said axis, an annular hub element surrounding said axis and mounted for rotation with said one clutch member, said annular carrier and hub elements being formed complementally each with a plurality of lugs spaced angularly about said axis, the lugs of one element being interposed between the lugs of the other element and angularly spaced therefrom with intervening circumferential clearances in the provision of a mechanical lost motion interlock between the elements wherein the lugs of one element bear against the lugs of the other element at a first series of points angularly spaced about the rotational axis of the clutch in establishing a forward driving connection and limit of relative rotative movement in one direction between the elements, and wherein the lugs of one element bear against the lugs of the other element at a second series of similarly spaced points in establishing a reverse driving connection and limit of relative rotative movement in the other direction between the elements, said one member comprising axially spaced bearing portions having circular surfaces concentric to said axis and, between such surfaces, an intervening drive portion, drivers interposed between the driving and driven members and actuated by said relatively rotatable carrier element, the annular carrier element comprising a pair of axially spaced rings respectively surrounding and supported on the bearing portions of the one member, a plurality of circumferentially spaced guides extending axially between and secured to the rings of the carrier element, said guides being disposed between and spacing the drivers and the drivers being confined axially by and between the spaced rings of the carrier, said one member being formed with a pair of axially spaced radial shoulder means, one ring of the carrier element being engaged against one of the shoulder means and resisting axial shifting of the carrier element relative to the one member in one direction, the other ring of the carrier being engaged against the other of the shoulder means to resist such relative axial shifting in the other direction, whereby said engagement of the rings against said shoulders retains the carrier element in fixed axial relation to the one member, and said drivers engaging the drive portion of the one member and with said driving and driven members being adapted to establish a torque connection between the members upon relative movement of the carrier and hub elements toward said forward limit and releasing the torque connection between the members upon relative movement of the elements toward the reverse limit.

3. A clutch comprising driving and driven members mounted for rotation about a common axis, an annular carrier mounted on one of the members for relative rotation about said axis, an annular hub surrounding said axis and mounted for rotation with said one clutch member, said one member having axially spaced annular bearing surfaces concentric to said axis and, between such surfaces, an intervening drive portion, a plurality of drivers interposed between the driving and driven members, the annular carrier comprising a pair of axially spaced rings and a plurality of axial guide elements extending between and connecting the rings, said rings slidingly engaging and being supported by the annular bearing surfaces of the one member for relative rotation and said guide elements being disposed between and spacing the drivers, said one member being formed with a pair of axially spaced oppositely directed radial shoulders adjacent and axially fixed relative to the annular bearing surfaces, one ring of the carrier being engaged against one of said shoulders to resist axial shifting of the carrier relative to the one member in one direction, and the other ring being engaged against the other shoulder to resist such relative axial shifting in the other direction, said engagement of the rings against the shoulders retaining the carrier in fixed axial relation to the one member.

4. In a clutch comprising driving and driven torque members and means mounting the members for relative rotation about a common axis, driver means interposed between the torque members, a carrier member mounted on one of the torque members for relative rotative movement about said axis and controlling the driver means, the carrier member, upon being rotated forwardly relative to the driver member on which it is mounted, being adapted to shift the driver means to drive position in which the latter establishes a forward driving connection between the torque members and, upon being rotated relatively rearwardly, being adapted to shift the driver means to release position in which the torque members are disconnected for said relative rotation; one torque member and the carrier member each having a series of lugs arranged in a circle concentric to the clutch axis and circumferentially spaced from one another about such axis, the lugs of one series being disposed between the lugs of the other series, the lugged members being formed with radial annular faces confronting one another, said confronting faces being located radially outwardly of the lugs and in axially spaced planes, the lugs of one series extending axially substantially to the plane of the confronting face of the other lugged member, one of the lugged members being formed with radially outwardly directed surface portions that generate a cylindrical surface located radially inwardly of the confronting faces and concentric to the clutch axis, some of said surface portions being substantially axially coextensive with the space between the confronting faces; and spring means supported on such outwardly directed surfaces in embracing relation, confined between the confronting faces, and connected between the lugged members, the spring means being stressed to bias the lugged members for relative rotative movement to the position in which the driving connection is established.

5. In a clutch as defined in claim 4 the outwardly directed surface portions including a surface disposed axially beyond the axial limits of all the lugs to provide radial support for the confined spring means over an area having an axial extent greater than that of the lugs.

6. In a clutch comprising driving and driven torque members and means mounting the members for relative rotation about a common axis, driver means interposed between the torque members, a carrier member mounted on one of the torque members for relative rotative movement about said axis and controlling the drive means, the carrier member, upon being rotated forwardly relative to the driver member on which it is mounted, being adapted to shift the driver means to drive position in which the latter establishes a forward driving connection between the torque members and, upon being rotated relatively rearwardly, being adapted to shift the driver means to release position in which the torque members are disconnected for said relative rotation; one torque member and the carrier member each having a series of lugs arranged in a circle concentric to the clutch axis and circumferentially spaced from one another about such axis, the lugs of one series being disposed between the lugs of the other series, the lugs being formed with radially outwardly directed surface portions that generate a cylindrical surface concentric to the clutch axis, an elongated coil spring supported on such outwardly directed surface portions in embracing relation to and in direct contacting engagement with a plurality of the lugs of each said one torque member and the carrier member in alternating relation, the spring being connected at one end to the lugged torque member and at the other end to the carrier member, the spring being tensioned to bias the lugged members for relative rotative movement to the position in which the driving connection is established.

7. In a clutch comprising driving and driven torque members and means mounting the members for relative rotation about a common axis, driver means interposed between the members and movable angularly about said axis relative to one member being a drive position in which the members are drivingly connected for rotation in unison and a release position in which the members are disconnected for said relative rotation, a carrier member mounted on one of the torque members for relative angular movement rotatively about said axis and controlling the movement of the driver means, one torque member and the carrier member being formed with interfitting lugs arranged in a circle concentric to said axis, the carrier lugs alternating with the torque lugs with intervening clearance spaces permitting relative rotative movement of said lugged members between predetermined angularly spaced limits, latch means and means mounting the same for movement into engagement with the carrier member to arrest rotation of the latter at a predetermined stopping point, the drive means being moved from the drive position toward the release position during continued rotation of the lugged torque member by inertia after such arresting of the carrier member, retaining means and means mounting the same for movement into engagement with the lugged torque member at a predetermined holding point angularly spaced beyond the stopping point to prevent reverse rotation of such lugged torque member, the angular spacing of the holding point from the stopping point being greater than the relative angular movement of the carrier member in moving the driver means from drive position to release position and less than the angular spacing from such stopping point to one of said predetermined limits of rotative movement, and resilient means connected between the lugged members and exerting forces biasing them toward said drive position, said inertial movement of the lugged torque member relative to the carrier member to the limit permitted by the interfitted lugs and subsequent to engagement of the carrier member by the latch means positively effecting disconnection of the torque members and permitting engagement of the lugged torque member by said retaining means to hold the driver means in release position against said biasing forces.

8. In a clutch comprising driving and driven torque members, means including a shaft mounting the members for relative rotation about a common axis, one of the members comprising a primary hub part having axially spaced circular bearing portions concentric to the axis and, in the space between such portions, a drive portion symmetric about the axis, the hub part having annular radial shoulders at the ends of the drive portion, the other member having an internal annular surface surrounding the hub part in spaced relation, drivers in the space between the members and movable angularly about said axis relative to one member between a drive position in which the members are drivingly connected for rotation in unison and a release position in which the members are disconnected for said relative rotation, a carrier member comprising a main ring mounted on one of the bearing portions and abutted against one of the shoulders, said ring being formed on one side with a plurality of integral guide elements extending axially through the space between the torque members and between the drivers to control the latter and on its other side with a plurality of integral axially projecting lugs, the carrier also comprising an outrigger ring mounted on and supported by the other bearing portion and abutted against the other shoulder, means securing the outrigger ring to the ends of the guide elements, the shoulders being oppositely directed and axially fixed relative to the bearing portions to locate the carrier on the hub part and prevent relative axial shifting in either direction, the one torque member also comprising a separate secondary hub part axially aligned with and fixed against rotation relative to the primary part and disposed adjacent the one bearing portion, said secondary part having a circular outer periphery and being formed with a plurality of integral axially projecting lugs angularly spaced about the axis and disposed between the carrier lugs in alternating relation and with intervening spaces providing for predetermined limited relative rotative movement of the carrier member relative to the secondary hub part between different engaged positions of the lugs, the carrier and hub lugs each having an outwardly directed arcuately curved surface and each being spaced radially inwardly from the peripheries of the main ring and the secondary hub part, respectively, the main ring and the secondary part having spaced confronting annular faces located radially outward of the lugs, elongated spring means tensioned about and at its ends secured to the carrier member and the secondary hub part, said spring means being disposed in the space between the confronting annular faces, radially inwardly of the peripheries and in direct contacting engagement with said arcuately curved surfaces of a plurality of each of the hub and carrier lugs, the spring means biasing the carrier member for rotation relative to the one torque member to shift the drivers toward the drive position, the limited movement of the carrier being greater than required to shift the drivers between drive and release positions, and latch means and means mounting the same for movement into engagement with the carrier member to arrest rotation of the latter at a predetermined stopping point, the tension of the spring means being increased and the drivers being shifted from the drive position toward the release position during continued rotation of the lugged torque member after such arresting of the carrier member, and motion limiting engagement of the lugs preventing overtravel of the one torque member.

9. In a clutch comprising driving and driven torque members, means including a shaft mounting the members for relative rotation about a common axis, one of the members comprising a primary hub part having axially spaced circular bearing portions concentric to the axis and, in the space between such portions, a drive portion symmetric about the axis, the hub part having annular radial shoulders at the ends of the drive portion, the other member having an internal annular surface surrounding the hub part in spaced relation, drivers in the space between the members and movable angularly about said axis relative to one member between a drive position in which the members are drivingly connected for rotation in unison and a release position in which the members are disconnected for said relative rotation, a carrier member comprising a main ring mounted on one of the bearing portions and abutted against one of the shoulders, said ring being formed on one side with a plurality of integral guide elements extending axially through the space between the torque members and between the drivers to control the latter and on its other side with a plurality of integral axially projecting lugs, the carrier also comprising an outrigger ring mounted on and supported by the other bearing portion and abutted against the other shoulder, means securing the outrigger ring to the ends of the guide elements, the shoulders being oppositely directed and axially fixed relative to the bearing portions to locate the carrier on the hub part and prevent relative axial shifting in either direction, the one torque member also comprising a separate secondary hub part axially aligned with and fixed against rotation relative to the primary part and disposed adjacent the one bearing portion, said secondary part having a circular outer periphery and being formed with a plurality of integral axially projecting lugs angularly spaced about the axis and disposed between the carrier lugs in alternating relation and with intervening spaces providing for predetermined limited relative rotative movement of the carrier member relative to the secondary hub part between different engaged positions of the lugs, the carrier and hub lugs each having an outwardly directed arcuately curved surface and each being spaced radially inwardly from the peripheries of the main ring and the secondary hub part, respectively, the main ring and the secondary part having spaced confronting annular faces located radially outward of the lugs, elongated spring means tensioned about and at its ends secured to the carrier member and the secondary hub part, said spring means being disposed in the space between the confronting annular faces, radially inwardly of the peripheries and in direct contacting engagement with said arcuately curved surfaces of a plurality of each of the hub and carrier lugs, the spring means biasing the carrier member for rotation relative to the one torque member to shift the drivers toward the drive position, the limited movement of the carrier being greater than required to shift the drivers between drive and release positions, latch means and means mounting the same for movement into engagement with the carrier member to arrest rotation of the latter at a predetermined stopping point, the tension of the spring means being increased and the drivers being shifted from the drive position toward the release position during continued rotation of the lugged torque member after such arresting of the carrier member, and motion limiting engagement of the lugs preventing overtravel of the one torque member, retaining means and means mounting the same for movement into engagement with the lugged torque member at a predetermined holding point angularly spaced beyond the stopping point to prevent reverse rotation of such lugged torque member, the angular spacing of the holding point from the stopping point being greater than the relative angular movement of the carrier member in shifting the drivers from drive position to release position and less than the angular spacing from such stopping point to one of said predetermined limits of rotative movement.

References Cited in the file of this patent

UNITED STATES PATENTS

| | | |
|---|---|---|
| 906,181 | Zeitz | Dec. 8, 1908 |
| 1,429,404 | Card | Sept. 19, 1922 |
| 1,578,370 | Ross | Mar. 30, 1926 |
| 2,140,737 | Dickens | Dec. 20, 1938 |

FOREIGN PATENTS

| | | |
|---|---|---|
| 120,107 | Great Britain | Oct. 31, 1918 |